R. H. MOORE.
PNEUMATIC SPINDLE.
APPLICATION FILED SEPT. 30, 1908.
961,307.
Patented June 14, 1910.
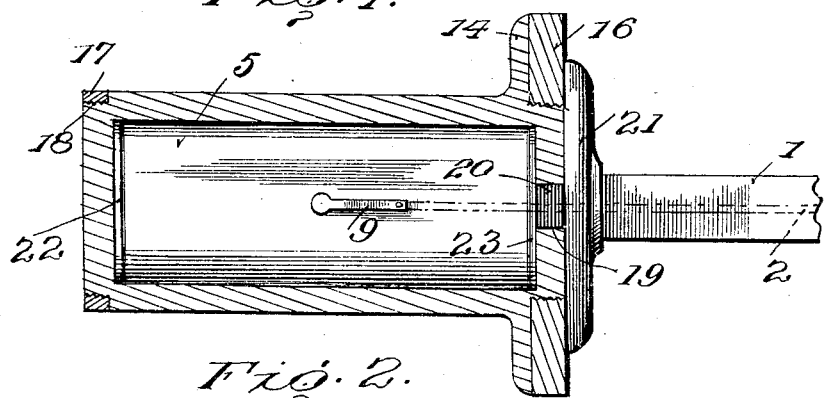
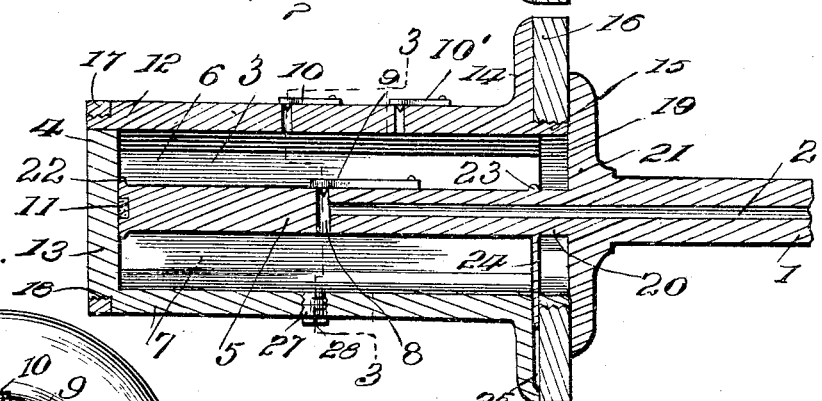
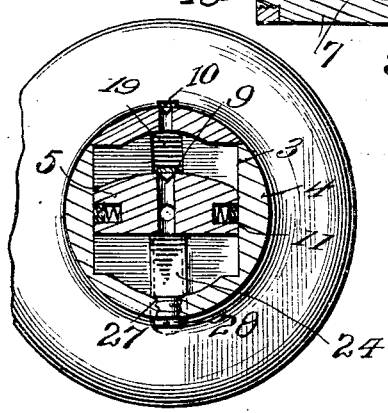
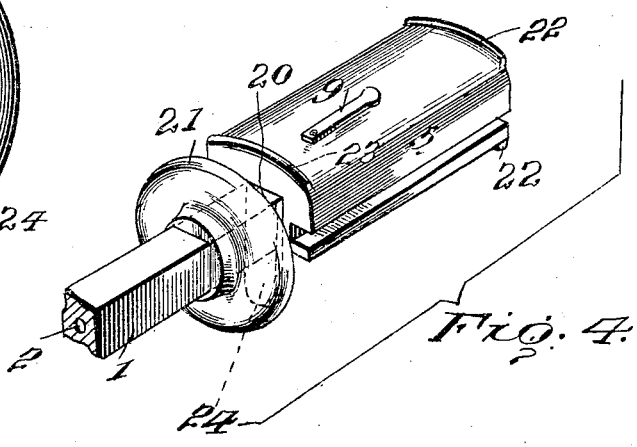
Inventor
R. H. Moore

UNITED STATES PATENT OFFICE.

REUBEN H. MOORE, OF JEFFERSONVILLE, INDIANA.

PNEUMATIC SPINDLE.

961,307.  Specification of Letters Patent.  Patented June 14, 1910.

Application filed September 30, 1908. Serial No. 455,419.

*To all whom it may concern:*

Be it known that I, REUBEN H. MOORE, citizen of the United States, residing at Jeffersonville, in the county of Clark and State of Indiana, have invented certain new and useful Improvements in Pneumatic Spindles, of which the following is a specification.

The object of my invention is to provide a device to be used in connection with wheels of any description wherein a pneumatic or cushion effect is desired, and to obtain such result without resorting to the use of pneumatic rubber tires.

The device is designed to operate within the hub section of a wheel and eliminate the expense and other objectionable features incident to the use of pneumatic tires, and is more particularly designed for use in connection with automobiles wherein a pump adapted to compress and maintain air at high pressure may be operated in connection with the motive power mechanism.

The invention further consists in the construction and arrangement of the several parts designed to form an air chamber within the wheel hub and by means of which the desired result is obtained.

For a full understanding of the invention, and the merits thereof and also to acquire a knowledge of the details of construction of the means for effecting the result, reference is to be had to the following description and accompanying drawings, in which:

Figure 1 is a horizontal sectional view of the spindle; Fig. 2 is a vertical sectional view thereof; Fig. 3 a transverse section on the line 3—3 of Fig. 2; and, Fig. 4 a detail view of the axle.

Corresponding and like parts are referred to in the following description and indicated in all the views of the drawings by the same reference characters.

Referring to the drawings, the numeral 1 designates an axle provided with an air passage 2 adapted to carry a supply of air from a central pump or reservoir, (not shown) and located within the body portion of the vehicle, to a chamber 3 formed within the spindle cylinder 4. The axle is provided with flattened portions 5 designed to slide vertically within the chamber and when occupying a central or normal position will intersect and divide said chamber into two separate compartments 6 and 7.

The spindle cylinder is designed to be supported rotatably in a suitable hub, ball bearings being interposed between the hub and the cylinder so that the inner face of the hub is spaced from the exterior face of the cylinder in order that the valves 10 and 10' may operate properly. I do not show the wheel structure, the hub, or the means whereby the hub is retained upon the spindle, as these constructions are well known and form no part of my invention.

The longitudinal air passage 2 within the axle is provided with an opening or outlet 8 extending through the flattened end portion 5, and by means of which compressed air is introduced into the air compartment 7 under sufficient pressure to counteract the stress placed upon the axle, and to force the readjustment of said end portions to a normal position within the chamber, consequent upon unusual or severe vibrations. The compartment 6 is designed to contain air under sufficient pressure to counteract the rebound of the axle when unseated from its normal position, and the pressure therein is regulated by a spring valve 9 located upon the upper side of said flattened end portion and seated in the opening 8. This valve is provided with a relatively strong spring of such resiliency that it will open only to the predetermined pressure of air in the compartment 7. When the pressure of the air in this compartment 7 increases beyond the predetermined point, then, and only then, the valve 9 will open permitting the escape of a certain amount of the compressed air from the compartment 7 into the compartment 6. The object of the valve 9 is simply to relieve the pressure in the compartment 7 if by any means it becomes too great. The air in this chamber 7 is intended to be retained therein at a certain pressure which is to be determined by the size of the spindle and the weight of the load. Thus assuming that the load weight is 3000 pounds and the flattened end 5 of the axle is 2x8 inches there will be 16 square inches in one of the flattened portions, 5, and 64 square inches over all the four wheels. In order to lift or support a load of 3000 pounds it will be necessary to have a pressure in the compartment 7 of about 50 pounds to the square inch. In case this pressure falls below that degree it is increased by the air pump which is connected to the passage 2 of the axle, this pump working automatically in the same manner as the air pumps which are used for compression air brakes on street cars. The air pump is not shown, however, as it is a well known appliance and forms no part of my invention. Whenever the pressure in the chamber 7 falls below the 50 pounds this air pump serves to measure the pressure of air in the chamber 7. If, however, the pressure in this chamber exceeds 50 pounds it will open the valve 9 against the elasticity of the spring. Therefore when the pressure exceeds 50 pounds the valve 9 rises and permits the escape of a portion of the air into the compartment 6. As soon as the pressure has been reduced to the predetermined degree in the compartment 7 the valve 9 closes.

The numeral 11 designates spring pressed packing in the abutting ends and sides of the flattened end portion 5, adapted to coöperate with the valves 9 and 10 to maintain the proper relative pressure in the compartments 6 and 7 without danger of the pressure becoming equalized and thereby counteracting the effect of one upon the other.

The cylinder 4 is preferably composed of two sections, a top or lid portion 12 forming one side of the chamber and a body or main section 13 in which the chamber is formed. Said cylinder is provided at one end with a flange 14 and a relatively reduced threaded end portion 15, arranged to receive a threaded ring 16 and coöperate with the threaded ring 17 engaging the reduced peripheral portion 18 at the opposite end of the cylinder, both of said rings being flush with the abutting cylinder ends and adapted to hold the top 12 and main section 13 securely together.

The numeral 19 designates a vertical slot formed in the end of the cylinder 4, and 20 a squared neck on the axle 1 designed to fit within said slot and allow vertical movement of the flattened end portion 5 within the chamber 3. An annular flange or projection 21 upon the axle 1 is adapted to slidably abut the end of said cylinder and ring 16 and form an air-tight closure for the slot 19 regardless of the relative vertical position of the axle to the cylinder. The said flange or projection 21 coöperating with projections 22 and 23 formed upon the broad side of the flattened end portions 5, and slidably abutting against the inner ends of the cylinder, also serve to hold the wheel perpendicular to the axle and prevent the same from careening.

The numeral 24 designates a projecting web on the flattened end portion 5 and so disposed as to slide within the recess 25 in the face of the flange 14 and form an air-tight closure for the slot 19 when the axle is unseated from its normal position, within the chamber.

An oil valve 10 is located in the cylinder for the admittance of oil to properly lubricate the packing 11, and an outlet 27 in said cylinder closed by a plug 28 is arranged for the removal of the excess oil or water due to the condensation of moisture in the air compartment 7.

With the arrangement of the several parts as shown, the cylinder 4 is adapted to occupy a position within the hub section of a wheel, being spaced from the same by ball bearings or other common spacing means and the flattened end portion 5 of the axle extending into the chamber formed therein is held in a central or normal position by the air pressure exerted upon the under side of said flattened end portion, supplied by a central pump or reservoir through the air passage 2 and outlet 8.

Any desired means may be employed to maintain the pressure within the air compartment 7 at the desired point to sustain the weight of the vehicle and offer a pneumatic resistance to vibratory shocks sustained by said body portion or wheels, and secure the effect ordinarily obtained by the use of pneumatic tires, said means being preferably the form of air pump previously referred to.

As before stated, the two compartments formed within the chamber 3 are made non-communicative by the use of a spring pressed packing 11 at the edges of the flattened end portion, the relative degree of pressure therein being regulated by the valve 9 arranged in the flattened end portion 5 and adapted to automatically open or close when the pressure in the compartment 6 drops below the desired point. The valve 10' in the cylinder is also designed to automatically regulate the air pressure in the compartment 6 when said pressure exceeds the point necessary to counteract the rebound of the flattened end portion consequent upon vibratory shocks to the axle or wheels of the vehicle.

The several parts comprising the cylinder coöperating with abutting sections of the axle and projection 24 are designed to form an air-tight closure for the slot 19 and at the same time hold the cylinder and wheel perpendicular to the axle at all times.

Having thus described the invention, what I claim as new and desire to secure by Letters Patent is:—

1. A pneumatic spindle comprising a hollow cylindrical body portion formed at one end with a vertical slot, an axle extending through said slot and provided with a flattened end portion transversely bisecting the chamber inclosed by said spindle, said axle being provided with a longitudinally extending compressed air inlet passage opening upon the under side of the end portion, and means whereby when the compression beneath the flattened end of the axle becomes too great, it may be relieved by allowing the surplus air to flow into the upper portion of the chamber.

2. A pneumatic spindle comprising a cylindrical body portion inclosing a chamber and formed at one end with a vertical slot, an axle extending through said slot and provided with an expanded end portion bisecting the said chamber, said axle being vertically movable with relation to the chamber, said axle being further provided with a longitudinally extending air inlet passage opening on the under side of the end portion of the axle, means for relieving excessive pressure in the lower portion of the chamber beneath the expanded portion of the axle and carrying the surplus air therefrom into the upper portion of the chamber above the expanded end of the axle, and means for relieving excessive pressure in the upper portion of the chamber.

3. A pneumatic spindle embodying a cylindrical body portion comprising a chamber, said chamber being square sided and formed at one end with a vertical slot, an axle extending through the slot and provided with an expanded end portion bisecting said chamber, said axle being formed with a longitudinally extending passage therethrough opening upon the underside of the end portion, a flange on the axle in front of the body portion and contacting with the end face thereof and closing said slot, a passage extending through the expanded portion of the axle from the underside to the upper side thereof, a valve controlling the passage of air therethrough, but permitting its passage upon an increase of pressure in the lower portion of the chamber, and a valve for controlling the outlet of air from the upper portion of the chamber to the exterior of the body.

4. A pneumatic spindle comprising a cylindrical body portion, provided with an outwardly extending annular flange at one end, said body inclosing a chamber, one end wall of the chamber being formed with a vertical slot, a ring plate surrounding the end of the chamber and disposed beyond the annular flange thereof and spaced from said annular flange at its lower face, an axle extending through said slotted end and into said chamber and formed with an extended end portion bisecting the chamber, said axle having a longitudinal passage opening to the underside of the expanded end and connected with a source of compressed air, an upwardly and downwardly extending flange engaging with the outer face of the ring plate, and a downwardly extending web formed on the axle inward of said last named flange and movable within the space between the said ring plate and the face of the annular flange at the end of the chamber.

5. A pneumatic spindle comprising a body portion provided with a chamber and formed at one end with a slot, an axle provided with a flattened end portion adapted to extend through said slot into said chamber and also provided with an air passage, a valve in said flattened end portion arranged to regulate the relative pressure on both sides of said end portion within said chamber, and a valve in said body portion of the spindle coöperating with the first mentioned valve to regulate the degree of pressure.

In testimony whereof I affix my signature in presence of two witnesses.

REUBEN H. MOORE. [L. S.]

Witnesses:
HENRY H. DREYER,
GEORGE W. COWARD.